Aug. 23, 1966  R. K. HARPER  3,268,331
PERSISTENT INTERNAL POLARIZATION SYSTEMS
Filed May 24, 1962  2 Sheets-Sheet 1

INVENTOR.
Richard K. Harper
BY
Curtis, Morris & Safford
ATTORNEYS

Aug. 23, 1966   R. K. HARPER   3,268,331
PERSISTENT INTERNAL POLARIZATION SYSTEMS
Filed May 24, 1962

INVENTOR.
Richard K. Harper
BY
Curtis, Morris & Safford
ATTORNEYS

United States Patent Office 3,268,331
Patented August 23, 1966

3,268,331
PERSISTENT INTERNAL POLARIZATION SYSTEMS
Richard K. Harper, Boston, Mass., assignor to Itek Corporation, Lexington, Mass., a corporation of Delaware
Filed May 24, 1962, Ser. No. 197,365
1 Claim. (Cl. 96—1)

The present invention relates to improved systems showing persistent internal polarization, and relates particularly to improved methods for forming a persistent internal polarization signal in a body showing persistent internal polarization, and to bodies containing such signals.

The phenomenon of persistent internal polarization (PIP) is known to the art, and is discussed in detail for example in Physical Review, volume 97, No. 6 (1955), pages 1596–1610, and Photographic Science and Engineering, volume 4, No. 6 (1960), pages 345–353. As taught in these sources, the phenomenon of PIP involves the generation of mobile charges in a photoconductive insulating material under the influence of activating radiation such as light, the simultaneous or subsequent separation of these charges in the material exhibiting PIP under the influence of an electric field applied to the material, the resultant formation of separated charge (polarization) in the material, which polarization persists after removal of activating radiation and the polarizing field, and subsequent detection of a latent polarization image in the persistently polarized material by a variety of methods including electronic and visual detection of the polarization image.

The present invention pertains to a method for forming a latent polarization image in a material showing the phenomenon of persistent internal polarization by a dual exposure process in which the direction of the polarizing electric field is in opposite directions for the two exposures. According to the present invention, latent polarization images are formed in a PIP material more easily than by prior methods. This permits the formation of such latent images with smaller quantities of charge-generating radiation, with lower polarizing fields, and/or with less photosensitive polarizable media.

A better understanding of the present invention will be had by referring to the accompanying drawings, in which FIGS. 1 and 2 are schematic drawings showing the formation of a latent polarization image in a polarizable medium by a first exposure to uniform charge-generating radiation (FIG. 1) and a second exposure to a pattern of imaging radiation (FIG. 2);

Figure 1:
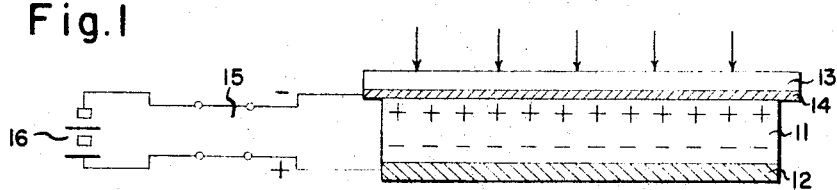
Figure 2:
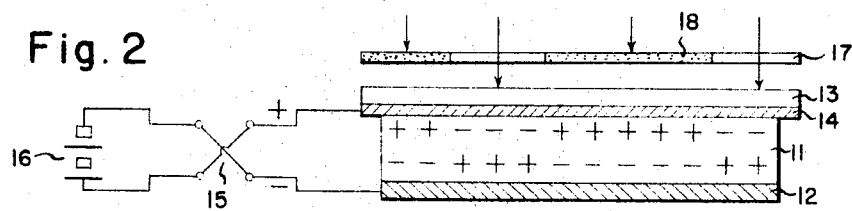
Figure 3:
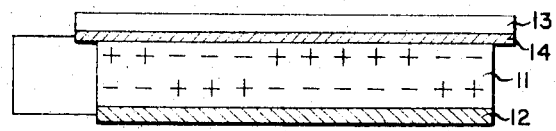
FIG. 3 shows an arrangement for storing a polarizable medium having a latent polarization image therein.

In FIGS. 1–3 body 11 is of a material showing the persistent polarization effect. For example, these materials are activated (Cd:Zn)S phosphors, ZnS, doped ZnS, $ZnSiO_3$, alkali halides, anthracene, chrysene, or other inorganic or organic photoconductors having a high resistivity in the dark. Photoconductive body 11 is conveniently in the form of a thin layer or film of finely divided persistently polarizable particles dispersed in a high resistivity binder matrix and deposited on a conductive electrode 12, for example of metal. Suitable insulating binder materials are insulating resins such as polyvinylidene chloride, nitrocellulose, alkyd resins, and the like. A second electrode, shown in FIGS. 1–3 as transparent glass plate 13 having a thin electrically conducting film 14 thereon (e.g., "Nesa" glass having a conductive tin oxide coating), is placed in contact with polarizable body 11. Through reversing switch 15 of FIG. 1, transparent electrode 13–14 and first electrode 12 are respectively connected to the negative and positive terminals of voltage source 16, whereby a polarizing field is established between the electrodes. On irradiation of the arrangement shown in FIG. 1 with uniform charge-generating radiation, mobile electric charges are generated in the body 11 and migrate under the influence of the applied field to that electrode of opposite polarity.

The radiation employed to activate body 11 by generating mobile charges therein includes ionizing corpuscular radiation, such as alpha and beta rays, and electromagnetic radiation which is absorbed in the material, such as gamma rays, X-rays, ultraviolet, visible and infrared light. The amount of radiation (e.g., visible, ultraviolet, or infrared light) required for activation (mobile charge generation) is principally a function of the PIP material used. Quantities of light less than 1 foot candle-second will form suitable images when the present process is applied to conventional PIP bodies.

The polarizing voltage used to separate the mobile charges can be as low as 50–75 volts, although voltages as high as possible are preferred, and voltages of about 300 volts are commonly used. Maximum voltages are limited by the dielectric breakdown properties of the system. Polarizing voltages as high as 1000 volts have been applied without arcing between the electrodes sandwiching certain PIP bodies.

On removal of the charge-generating radiation (and of the polarizing field, if desired), the charges generated in the body 11 by the radiation and separated by the polarizing electric field will remain in their separated state, resulting in a persistent internal polarization of body 11.

FIG. 2 shows the same body 11 of polarizable material, together with the electrode structure 12–14, connected to source 16 through switch 15 with the polarity of the electrodes reversed. With the electrodes so connected, body 11 is subjected to a pattern of charge-generating radiation through transparent electrode 13–14. The radiation, however, is patterned, for example by passage through mask 17 comprising portions 18 which are opaque to the polarizing radiation.

In those portions of body 11 struck by light passing through mask 17, the separated charges are re-mobilized or released, and the direction of internal polarization is reversed by movement of the released charges in response to the reversed polarizing field between electrodes 12 and 13–14. It will be noted that the reversed applied field in body 11 is enhanced by the field established by the charges separated in the first polarization step. In consequence, rapid reversal of internal polarity occurs in those areas struck by radiation even when the imaging radiation or the polarizing field is weak or the phosphor is relatively insensitive to the releasing radiation.

After reversal of the polarization in selected portions of body 11 and removal of charge-generating radiation and the polarizing field, the resultant latent polarization image comprising positive and negative polarized charges at the surface of body 11 can be stored for considerable periods of time by electrically connecting electrodes 12 and 14, as shown in FIG. 3. Since the image decay will naturally proceed slowly, it may not be necessary to connect electrodes 12 and 14 if the natural decay will satisfy the desired storage life requirement.

The pattern of latent polarization in body 11 of FIG. 2 or 3 can be detected by techniques suitable for discriminating between positive and negative surface charge. These techniques may be electronic, as discussed in the articles mentioned earlier. Also, by removal of one of the electrodes from polarized body 11, the surface of the body may be developed by contact with charged particles which are selectively attracted to either positively or negatively charged surface portions of the polarized body.

Figure 4:
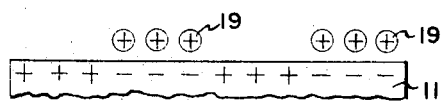
FIGS. 4 and 5 are schematic drawings showing visual development of a latent polarization image by positively charged opaque particles.

FIG. 4, for example, shows the development of the latent polarization image in the surface of body 11 of FIG. 2 or 3 by application to the surface of a plurality of positively charged particles 19 which are preferentially attracted to and deposited on negatively charged surface portions of body 11. Developers producing visible images in this fashion are well known in the art, for example in the electrostatic reproduction arts, and may comprise dusts of finely divided opaque solid particles, or such particles suspended in an aerosol of liquid medium.

The visible image formed as shown in FIG. 4 by development of body 11 exposed as in FIGS. 1 and 2 will be a negative of the image pattern to which body 11 is exposed in the second exposure step of FIG. 2, i.e. the image formed by development will be a negative image of mask 17 of FIG. 2. However, positive images of the radiation pattern can be produced either (1) by using negatively charged opaque particles for development, which, conversely to FIG. 4, will be attracted to positively charged surface portions of body 11, or (2) by reversing the direction of the respective fields applied to electrodes 12 and 13–14 in FIGS. 1 and 2.

Figure 5:
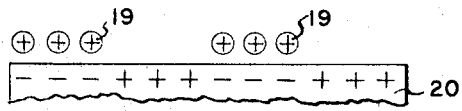

For example, if electrode 13–14 of FIG. 1 is first positively charged and electrode 12 is negatively charged, and then the electrodes are respectively negatively and positively charged during the exposure step shown in FIG. 2, the direction of polarization shown in body 11 of FIG. 4 will be reversed as shown in FIG. 5 herein. Development of body 20 of FIG. 5, in which the direction of polarization is opposite to that of body 11 in FIG. 4, with a positively charged electroscopic powder 19 will give a positive image of image pattern 17 for example.

Figure 6:
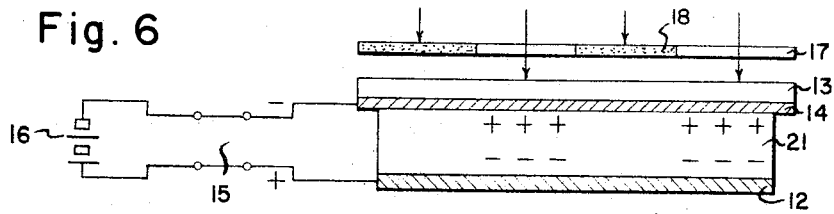
FIGS. 6 and 7 are schematic drawings showing an alternative exposure technique according to the present invention in which a first exposure to imaging radiation (FIG. 6) is followed by a second exposure to the same imaging radiation (FIG. 7).

FIG. 6 shows another embodiment of the invention in which body 21 of a material showing the persistent internal polarization effect and having electrodes 12 and 13–14 applied thereto is exposed to a pattern of imaging radiation, for example through mask 17 having opaque portions 18, while electrodes 13–14 and 12 are respectively connected through reversing switch 15 to a current source 16 such that top-most electrode 13–14 is negatively charged, and bottom-most electrode 12 is positively charged.

Figure 7:
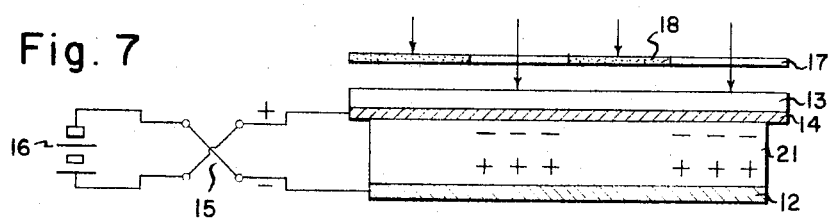
Figure 8:
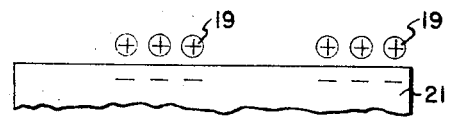
FIG. 8 shows a technique for the visual development of a latent polarization image produced by the techniques of FIGS. 6 and 7.

FIG. 7 shows the same structure of FIG. 6 in which the polarity of electrodes 13–14 and 12 has been reversed through reversing switch 15. With the polarity on the electrodes reversed, body 21 is re-exposed to imaging radiation through mask 17, resulting in a reversal of the direction of polarization in the area struck by the image forming radiation. Unlike the body 11 of FIGS. 2–5, body 21 contains a latent polarization image formed by a pattern of polarized and unpolarized material. In FIG. 4, for example, body 11 contains a latent polarization image comprising areas polarized in opposite directions. In this respect, body 21 of FIGS. 7 and 8 more closely resembles polarized bodies exposed according to prior art processes; but differ significantly from such bodies in the better quality of image reproduction which it gives on development.

It is believed that the sharper images obtained in PIP bodies by exposure to imaging radiation and an applied field, followed by re-exposure to the same imaging radiation with field reversal, as in the present invention, is due to a recombination and elimination, during the re-exposure step, of undesirable charges generated in peripheral portions of those sections of photoconductive body 21 exposed to imaging radiation in the first exposure step. When charge-generating radiation is incident on a photoconductive insulating body, as in the present invention, diffraction of the incident radiation in surface layers of the body may cause the formation of mobile charges in areas peripheral to those directly struck by the radiation. Development of a latent polarization image formed in this manner tends to give fuzzy, blurred, or otherwise non-uniform image areas. However, if the body is re-exposed to the imaging radiation in the presence of a reversed field, as in FIG. 7, it is believed that in those portions of body 21 directly struck by the incident radiation the charges become fully mobile and migrate rapidly to reverse the direction of internal polarization. However, the quantity of radiation diffracted into peripheral portions of the radiated areas, where stray charges are present, is not sufficient to cause such charge mobility as results in the reappearance of the stray charges aligned in an opposite direction of polarization, but is sufficient to impart mobility of the charges to cause their recombination in peripheral areas where radiation intensity is low. Removal of stray charges in peripheral areas by recombination promotes the formation of sharper images on development, as in FIG. 8.

Figure 9:
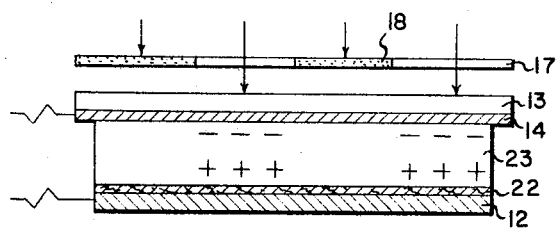
FIG. 9 is a schematic drawing showing a still further exposure technique according to the present invention.

Referring now to FIG. 9, there is here illustrated another embodiment of the present invention in which the PIP material is supported on a substrate such as paper. This embodiment is generally similar to the embodiments shown on FIGS. 1 through 8, therefore, like parts will be referred to by the same numerals used in the previous figures. In FIG. 9, the PIP material 23, which is the same as the material used in FIGS. 1 through 8, is supported on a substrate 22. The substrate may be made of any material which is capable of conducting electricity. The substrate 22 is preferably a conductive paper, e.g. the conductive base papers known in the electrostatic art where the conductive properties of the paper are due to the presence of inorganic metal salts. Any of the exposure techniques heretofore disclosed in the connection with FIGS. 1 through 8 may be used in this embodiment. As shown in FIG. 9, the substrate 22 is placed in contact with the face of electrode 12 opposite the second electrode 14. The substrate 22 during radiation functions as part of the electrode 12 and the charges migrate between the substrate 22 and the electrode 14. Following exposure, developers may be used for producing visible images as discussed, for example, in connection with FIG. 4. That is, developers known in the electrostatic reproduction art which may comprise dust of finely divided opaque solid particles or particles suspended in aerosol or liquid.

It will be appreciated that the embodiments shown in the accompanying drawings can be considerably modified within the scope of the present invention. Thus, for example, in FIGS. 1, 2, 5, and 6 in which a photoconductive insulating material has been deposited on a permanent electrode 12 and a transparent electrode 13–14 has been shown as removble, the role of the electrodes can be reversed, the transparent electrode serving as a permanent electrode and an opaque electrode serving as a removable electrode. Also, in FIGS. 6–9, showing the formation of latent polarization image comprising negative polarization charges in top-most surface portions of body 21, and development of the body with positively charged particles, it will be understood that the direction of the fields in FIGS. 6, 7, and 9 respectively can be reversed to give a body having a latent image formed by positive polarization charges in the top-most surface thereof, which image will be developable with negatively charged particles, for example.

Although specific embodiments have been shown and described herein, it will be understood that they are illustrative.

What is claimed is:

The method which comprises polarizing at least a portion of a persistently polarizable body in a first polarization direction by exposing said body to an image pattern of radiation with a first polarizing voltage applied to said body, next exposing said body to said image pattern of radiation with a second polarizing voltage applied to said body, the direction of the field of said second polarizing voltage being opposite that of said first polarizing voltage, whereby a polarization pattern corresponding with said image pattern of radiation is formed in said persistently polarizable body, and then detecting said polarization pattern.

References Cited by the Examiner

UNITED STATES PATENTS

| | | | |
|---|---|---|---|
| 2,845,348 | 7/1958 | Kallman | 96—1 |
| 2,866,903 | 12/1958 | Berchtold | 96—1 |
| 2,912,592 | 11/1959 | Mayer | 96—1 |
| 2,922,883 | 1/1960 | Giaimo | 250—49.5 |
| 2,955,938 | 10/1960 | Steinhilper | 96—1 |
| 2,976,447 | 3/1961 | McNaney | 313—108 |
| 3,005,707 | 10/1961 | Kallman et al. | 96—1 |
| 3,013,890 | 12/1961 | Bixby | 96—1 |
| 3,043,684 | 7/1962 | Mayer | 96—1 |
| 3,199,086 | 8/1965 | Kallman | 96—1 |

OTHER REFERENCES

Darling et al.: "RCA Technical Notes" TN No. 368, June 1960 (2 pages).

Nakamura et al.: "Persistent Internal Polarization of Zinc Cadmium Sulfide and Its Application," Bulletin of Applied Physics, 30, 778 (1961).

Bulletin of Applied Physics 30, 778 (1961).

NORMAN G. TORCHIN, *Primary Examiner.*

A. LIBERMAN, D. D. PRICE, *Assistant Examiners.*